United States Patent
Cha et al.

(10) Patent No.: US 10,383,169 B2
(45) Date of Patent: Aug. 13, 2019

(54) BASE STATION AND TERMINAL CONNECTION MANAGEMENT METHOD OF BASE STATION

(71) Applicant: Samsung Electronics Co., Ltd., Suwon-si, Gyeonggi-do (KR)

(72) Inventors: Hwajin Cha, Seongnam-si (KR); Donmyoung Lee, Suwon-si (KR); Jungkap Lee, Seoul (KR); Hanseok Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 71 days.

(21) Appl. No.: 15/118,603

(22) PCT Filed: Feb. 16, 2015

(86) PCT No.: PCT/KR2015/001583
§ 371 (c)(1),
(2) Date: Aug. 12, 2016

(87) PCT Pub. No.: WO2015/122741
PCT Pub. Date: Aug. 20, 2015

(65) Prior Publication Data
US 2017/0055314 A1    Feb. 23, 2017

(30) Foreign Application Priority Data
Feb. 17, 2014   (KR) ........................ 10-2014-0017652

(51) Int. Cl.
*H04W 76/38* (2018.01)
*H04W 28/02* (2009.01)
*H04W 72/04* (2009.01)
*H04W 72/08* (2009.01)
*H04L 5/00* (2006.01)

(52) U.S. Cl.
CPC ....... *H04W 76/38* (2018.02); *H04W 28/0252* (2013.01); *H04W 28/0268* (2013.01); *H04W 72/0446* (2013.01); *H04W 72/085* (2013.01); *H04L 5/0053* (2013.01)

(58) Field of Classification Search
None
See application file for complete search history.

(56) References Cited

U.S. PATENT DOCUMENTS

| | | | |
|---|---|---|---|
| 7,680,478 B2 | 3/2010 | Willars et al. | |
| 2009/0040977 A1 | 2/2009 | Lee | |
| 2010/0304751 A1* | 12/2010 | Ji | H04L 1/02 455/450 |

(Continued)

FOREIGN PATENT DOCUMENTS

| | | | |
|---|---|---|---|
| KR | 10-2009-0016069 A | 2/2009 | |
| KR | 10-2012-0132284 A | 12/2012 | |

(Continued)

*Primary Examiner* — Bunjob Jaroenchonwanit
(74) *Attorney, Agent, or Firm* — Jefferson IP Law, LLP

(57) ABSTRACT

A terminal connection management method of the present invention comprises the steps of setting a signal timer corresponding to a signal bearer of a terminal and a data timer corresponding to a data bearer, confirming whether the signal timer and the data timer have expired, and disconnecting from the terminal if both of the signal timer and the data timer have expired.

12 Claims, 8 Drawing Sheets

(56) References Cited

U.S. PATENT DOCUMENTS

| | | | |
|---|---|---|---|
| 2012/0207069 A1 | 8/2012 | Xu et al. | |
| 2012/0300752 A1 | 11/2012 | Kwon et al. | |
| 2013/0329637 A1* | 12/2013 | Kodali | H04W 76/046 370/328 |
| 2014/0064156 A1* | 3/2014 | Paladugu | H04W 36/0022 370/259 |
| 2014/0200015 A1* | 7/2014 | Kweon | H04W 76/068 455/450 |
| 2015/0003254 A1* | 1/2015 | Sasaki | H04W 28/08 370/237 |
| 2015/0092554 A1* | 4/2015 | Mochizuki | H04W 24/10 370/235 |
| 2015/0148063 A1 | 5/2015 | Jung et al. | |
| 2015/0382298 A1* | 12/2015 | Muller | H04W 52/0212 370/311 |
| 2016/0044488 A1* | 2/2016 | Kim | H04W 8/005 370/328 |
| 2016/0219565 A1* | 7/2016 | Uchino | H04W 76/025 |
| 2016/0242191 A1* | 8/2016 | Liao | H04L 43/16 |
| 2017/0027018 A1* | 1/2017 | Langereis | H04W 72/042 |
| 2017/0265133 A1* | 9/2017 | Chandramouli | H04W 76/046 |

FOREIGN PATENT DOCUMENTS

| | | |
|---|---|---|
| WO | 2013/015662 A2 | 1/2013 |
| WO | 2013/172612 A1 | 11/2013 |

* cited by examiner

BASE STATION AND TERMINAL CONNECTION MANAGEMENT METHOD OF BASE STATION

TECHNICAL FIELD

The present invention relates to a base station and a terminal connection management method thereof; and, in particular, to a base station and method for detecting connected terminals in an inactive state and releasing the connections.

BACKGROUND ART

Recently, mobile phones have been widely used by the public. The mobile phone was once used only for voice calls, but now there are more various functions and recently released mobile phones support short messaging and multimedia messaging functions. More recently, so-called smart phones are widely used. Smartphones provide users with various functions such as web browsing, gaming, and map service. In order for users to enjoy and find convenient the functions of smartphones, there is an inevitable need for support for high speed data communication.

Recently, the 3$^{rd}$ Generation Partnership Project (3GPP) completed standardization of most parts of Long Term Evolution (LTE). In some countries, commercialized LTE services have been launched already. LTE communication technology supports much faster data communication than Wideband Code Division Multiple Access (WCDMA) communication technology. The present invention is directed to a communication system complying with the LTE standard. However, it is obvious that the present invention can be applied to other communication systems without departing from the spirit of the present invention. Although the term "evolved node B" (eNB) is used to mean "base station" in the present invention, the present invention can be applied to other systems operating with various types of base stations such as node B, Radio Network Subsystem (RNS), Base Transceiver Station (BTS), and wireless access point.

In LTE, a Radio Resource Control (RRC) protocol is used to allocate radio resources to the users. The RRC protocol takes charge of allocating radio resources to the user in need of communication and withdrawing the resources allocated but not in use by the user.

That is, the RRC protocol is a protocol for use in managing the radio resources allocated to User Equipment (UE) within a cell. According to the RRC protocol, the UE can be in two different states: RRC_IDLE and RRC_CONNECTED. The RRC_IDLE state is a state in which the UE has not been allocated radio resources from an eNB or a connection between the UE and the eNB has been released. The RRC_CONNECTED state is a state in which the UE has been allocated radio resources from the base station. In the RRC_CONNECTED state, the UE may transmit data in uplink and the eNB may transmit data in downlink.

If the UE has data to transmit or receive, it has to transition to the RRC_CONNECTED state. The UE in the RRC_CONNECTED state occupies more resources than the UE in the RRC_IDLE state. Accordingly, if there are too many UEs in the RRC_CONNECTED state among the UEs served by an eNB, the eNB is likely to undergo a call drop or call blocking situation. Thus the eNB monitors the traffic of the UEs to detect the UE in a so called non-communication state. In the case that there is no uplink or downlink traffic between the UE and the eNB over a predetermined time period, the eNB releases the connection of the corresponding UE to mitigate any resource shortage problem. This technique is referred to as User Inactivity Control Function or UE connection management method.

DISCLOSURE OF INVENTION

Technical Problem

The present invention provides a method and base station for managing UE connections in consideration of a signaling procedure of the UE.

Solution to Problem

In accordance with an aspect of the present invention, a terminal connection management method of a base station includes setting a signaling timer corresponding to a signaling bearer and a data timer corresponding to a data bearer, the bearers being allocated to a terminal; determining whether the signaling and data timers are expired; and releasing, when both the signaling and data timers are expired, the connection to the terminal.

In accordance with another aspect of the present invention, a base station for managing a connection of a terminal includes a communication unit which establishes a connection to the terminal to provide the terminal with a communication service; a storage unit which stores connection management information of the terminal; and a control unit which sets a signaling timer corresponding to a signaling bearer and a data timer corresponding to a data bearer, the bearers being allocated to the terminal, determines whether the signaling and data timers are expired, and releases, when both the signaling and data timers are expired, the connection to the terminal.

Advantageous Effects of Invention

The UE connection management method and eNB therefor according to the present invention is advantageous in terms of mitigating a user's inconvenience and unnecessary resource waste caused by the eNB making a wrong decision while determining whether the UE is in the non-communication state based on the signal procedure in progress.

MODE FOR THE INVENTION

Exemplary embodiments of the present invention are described in detail with reference to the accompanying drawings. The same reference numbers are used throughout the drawings to refer to the same or like parts. Detailed descriptions of well-known functions and structures incorporated herein may be omitted to avoid obscuring the subject matter of the present invention.

In the following description, the present invention is directed to the LTE communication technology. However, the present invention may also be applied to other communication technologies without departing from the spirit of the invention.

The UE connection management method of an eNB 700 operates as follows. The eNB 700 sets a User Inactivity Timer (UIT) per UE to determine whether the UE is in a non-communication state and initializes the UIT whenever new traffic occurs. If the UIT expires, the eNB 700 determines that the UE is in the non-communication state and releases the UE's connection to the eNB 700.

The UE in the RRC_CONNECTED state has two signalling radio bearers (SRBs) for control signaling and at least one data radio bearer (DRB) for data transmission. However, the UE connection management method has a drawback in that the UE may lose connection to the eNB 700 during a significant signaling procedure when the eNB 700 makes a wrong decision that the UE is in the non-communication state on the basis of the result of monitoring only the DRB for traffic.

Figure 1:
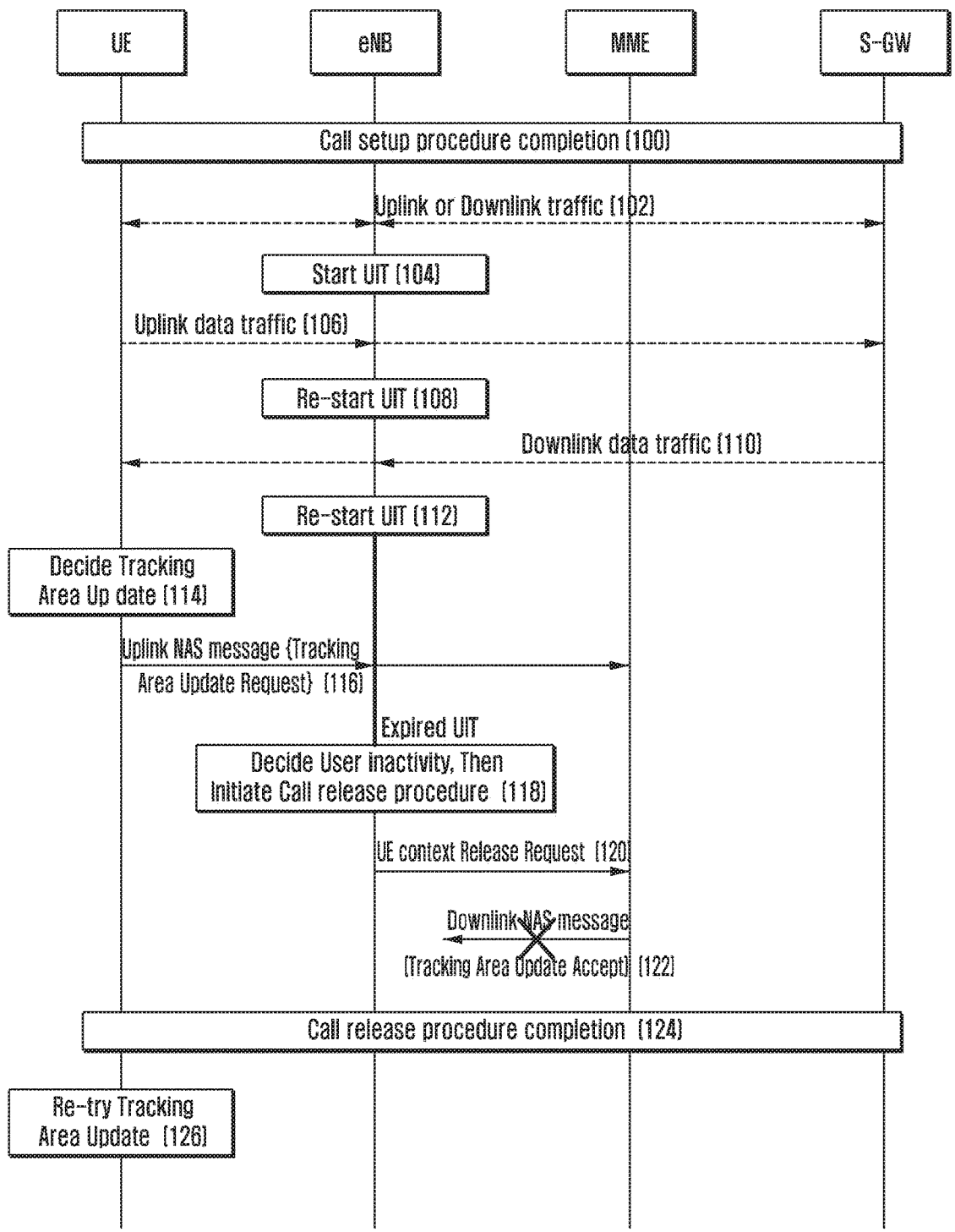
FIG. 1 is a signal flow diagram illustrating a UE connection management procedure of an eNB.

FIG. 1 is a signal flow diagram illustrating a UE connection management procedure of an eNB.

With reference to FIG. 1, the eNB completes a call setup procedure with the UE at step 100. After the call setup, if any uplink or downlink traffic occurs between the eNB and the UE at step 102, the eNB starts a UIT at step 104. The UE and eNB may communicate the uplink and downlink traffic at steps 106 and 110, and then the eNB initializes the UIT at steps 108 and 112.

The UE decides to perform a Tracking Area Update (TAU) at step 114. The UE sends the eNB 700 a Non Access Stratum (NAS) message for TAU request, and the eNB 700 forwards the NAS message to a Mobility Management Entity (MME) at step 116. However, the eNB 700 initializes the UIT only when data traffic is received. For this reason, even when the NAS message is received, the eNB 700 does not initialize the UIT.

If the UIT expires before receiving a response in reply to the NAS message, the eNB 700 determines that the UE is in the non-communication state and thus performs a connection release procedure with respect to the UE at steps 118 and 120. Due to the connection release of the UE or during connection release procedure, the response corresponding to the NAS message cannot reach the UE at steps 122 and 124. As a consequence, the UE retries the TAU request at step 126.

As described above, the UE connection management method of the base station 700 monitors only the DRB for traffic. This may cause connection release of the UE due to a wrong decision being made of the non-communication state during an important signaling procedure; thus, the UE has to start over the signaling procedure. In order to start over the signaling procedure, the UE has to perform the call setup procedure again. This means that the UE connection management method may cause unnecessary repetition of a certain procedure and user inconvenience due to the eNB 700 making a wrong decision.

In order to solve the above problem, monitoring of both the SRB and DRB for traffic can be considered. However, if a single UIT is used for monitoring both the SRB and DRB, this may cause other problems, which become clear in the description with reference to FIG. 2, because the signaling traffic and data traffic have different characteristics such as occurrence timing, occurrence frequency, and occurrence pattern.

Figure 2:
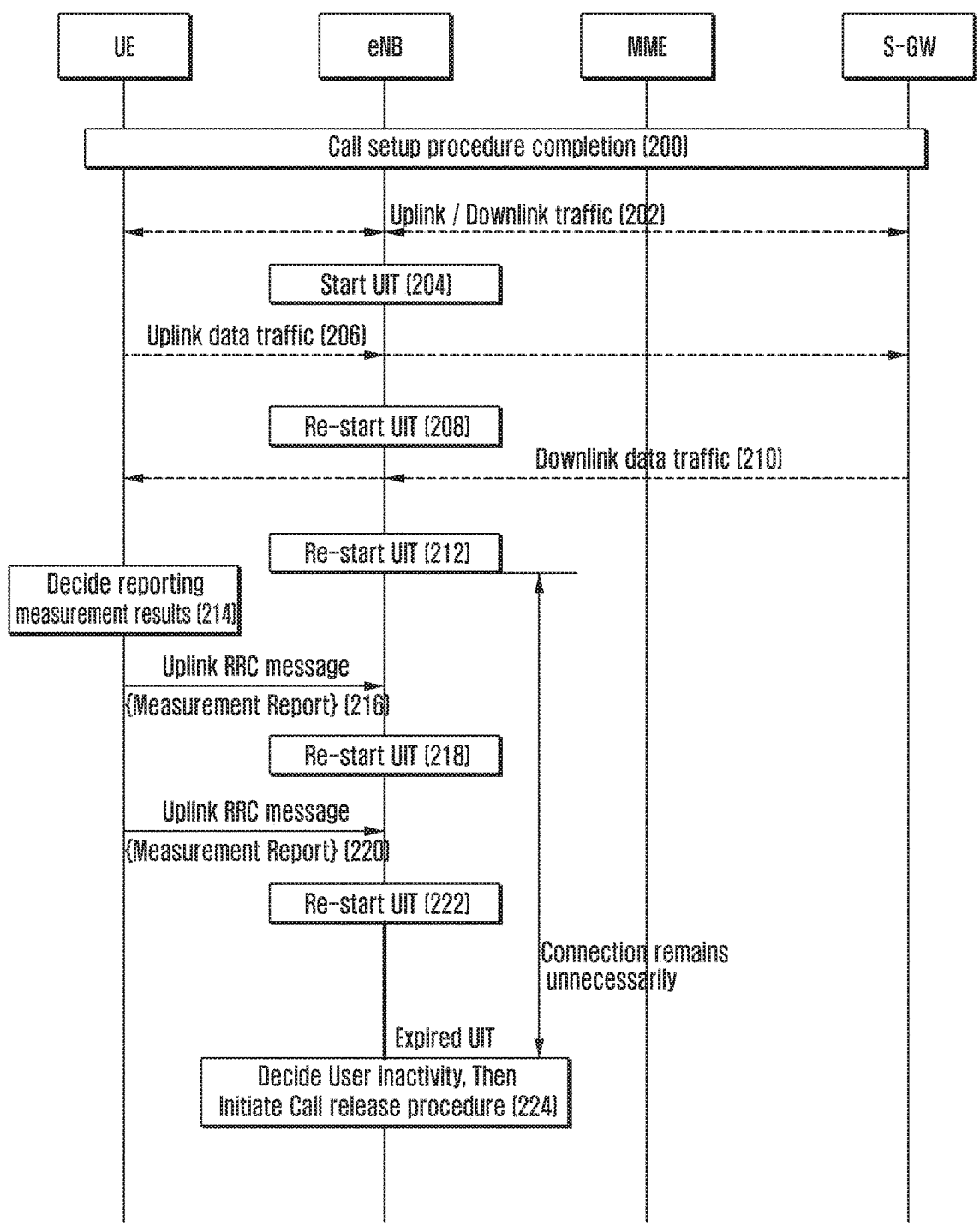
FIG. 2 is a signal flow diagram illustrating a UE connection management method of an eNB.

FIG. 2 is a signal flow diagram illustrating a UE connection management method of an eNB.

Since steps 200 to 221 of FIG. 2 are identical with step 100 to 112, detailed descriptions thereof are omitted herein.

With reference to FIG. 2, the UE decides to transmit a MEASUREMENT REPORT to the eNB 700 at step 214 and transmits an RRC message including the MEASUREMENT REPORT to the eNB 700 over an SRB at step 216 and 220. If the RRC message is received, the eNB 700 initializes the UIT at steps 218 and 220. If the UIT expires, the eNB 700 determines that the UE is in the non-communication state, and initiates a connection release procedure with respect to the UE at step 224.

In a conventional UE connection management procedure of an eNB, the UIT is extended because of the management-purpose signal traffic even though there has been no need to maintain the connection to the UE since step 212. That is, extending the UIT unnecessarily results in a radio resource waste problem.

Figure 3:
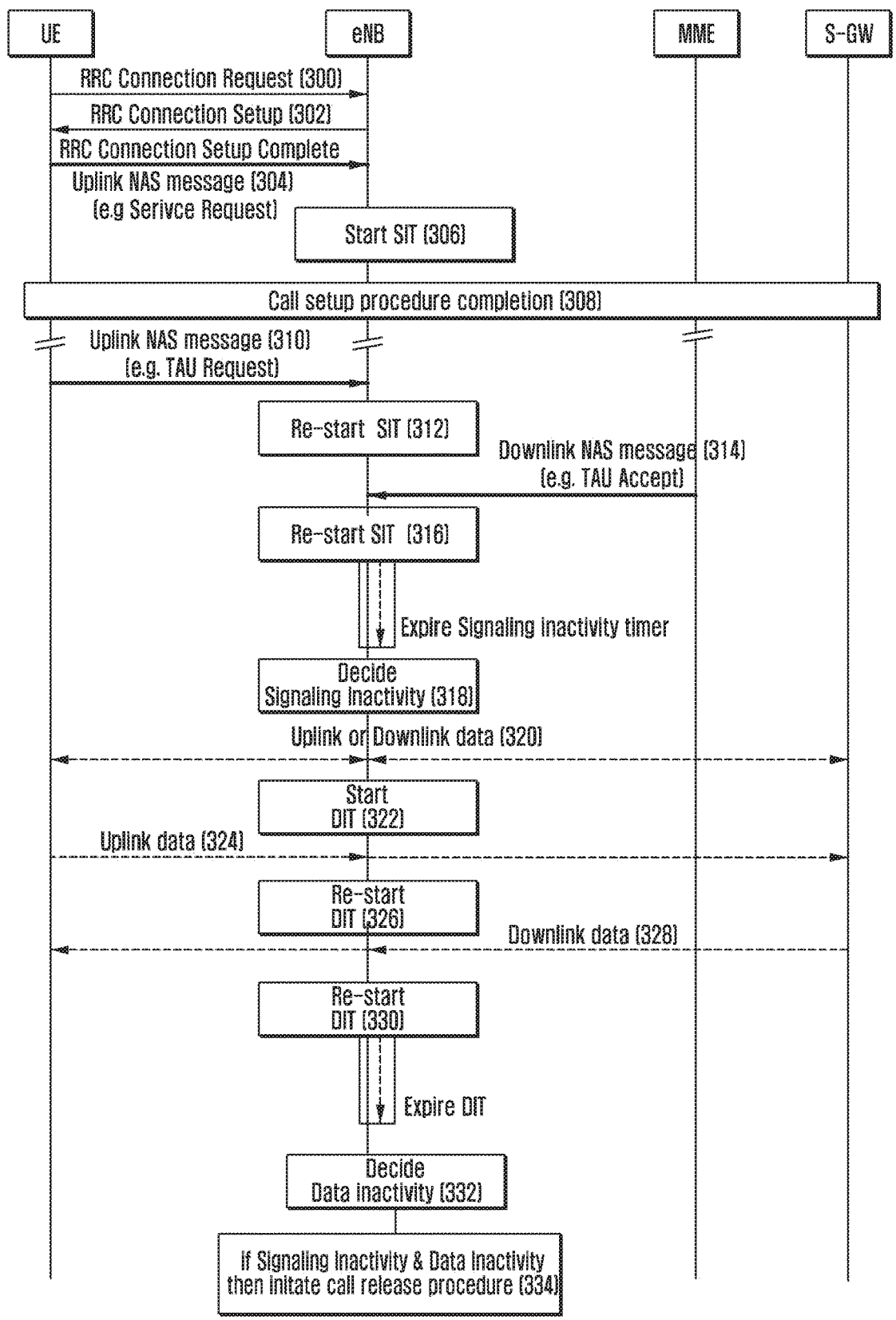
FIG. 3 is a signal flow diagram illustrating a UE connection management procedure of an eNB 700 according to an embodiment of the present invention.

FIG. 3 is a signal flow diagram illustrating a UE connection management procedure of an eNB 700 according to an embodiment of the present invention.

With reference to FIG. 3, the UE in the RRC_IDLE state initiates a procedure of transitioning to the RRC_CONNECTED state for communication. In order to transition to the RRC_CONNECTED state, the UE sends the eNB 700 an RRC_CONNECTION_REQUEST message at step 300. In reply, the eNB 700 sends the UE an RRC_CONNECTION_SETUP message at step 302. If the RRC_CONNECTION_SETUP message arrives, the UE transitions to the RRC_CONNECTED state and sends the eNB 700 an acknowledgement message (RRC_CONNECTION_SETUP_COMPLETE) at step 304. At this time, the RRC_CONNECTION_SETUP_COMPLETE message is transmitted in an NAS message such as SERVICE_REQUEST message.

If the NAS message is received, the eNB 700 starts a Signaling Inactivity Timer (SIT) at step 306. If the RRC_CONNECTION_SETUP_COMPLETE message is received, the call setup procedure is completed at step 308.

If an NAS message is transmitted in uplink or downlink between the eNB 700 and the UE at steps 310 and 314, the eNB 700 initializes the SIT at steps 312 and 316. The NAS message may include a TAU request message and a TAU accept message. In this embodiment, the eNB 700 initializes the SIT upon receipt of an NAS message. However, it may be possible for the eNB 700 to initialize the SIT upon receipt of another signal message other than the NAS message during a significant signaling procedure.

If the SIT expires without being initialized because no NAS message is transmitted in uplink or downlink between the eNB 700 and UE, the eNB 700 determines that the UE is in the non-signaling communication state at step 318.

If data are transmitted in uplink or downlink between the eNB 700 and the UE initially at step 320, the eNB 700 starts a Data Inactivity Timer (DIT) at step 322. Afterward, if data are transmitted in uplink or downlink between the eNB 700 and the UE at steps 324 and 328, the eNB initializes the DIT at steps 326 and 330.

If the DIT expires without being extended because of no further uplink or downlink data between the eNB 700 and the UE, the eNB 700 determines that the UE is in the non-data communication state at step 332.

If the UE is in both the non-signaling communication state and non-data communication state, i.e. if both the SIT and DIT expire, the UE 700 performs a connection release procedure with respect to the UE at step 334.

Although steps 320 to 330 follow step 318 in FIG. 3 to help in the understanding of the present invention, the operations of steps 320 to 330 may be performed at any time after step 308.

FIG. 3 shows the UE connection management procedure of the UE in which the non-communication state is determined for the respective signaling traffic and data traffic. In the case of an IP Multimedia Subsystem (IMS) service-enabled UE, the method for monitoring the SRB and DRB separately cannot reflect a processing state of the IMS signaling procedure to determine the non-communication state of the UE because the IMS signaling messages are transmitted over DRB.

Figure 4:
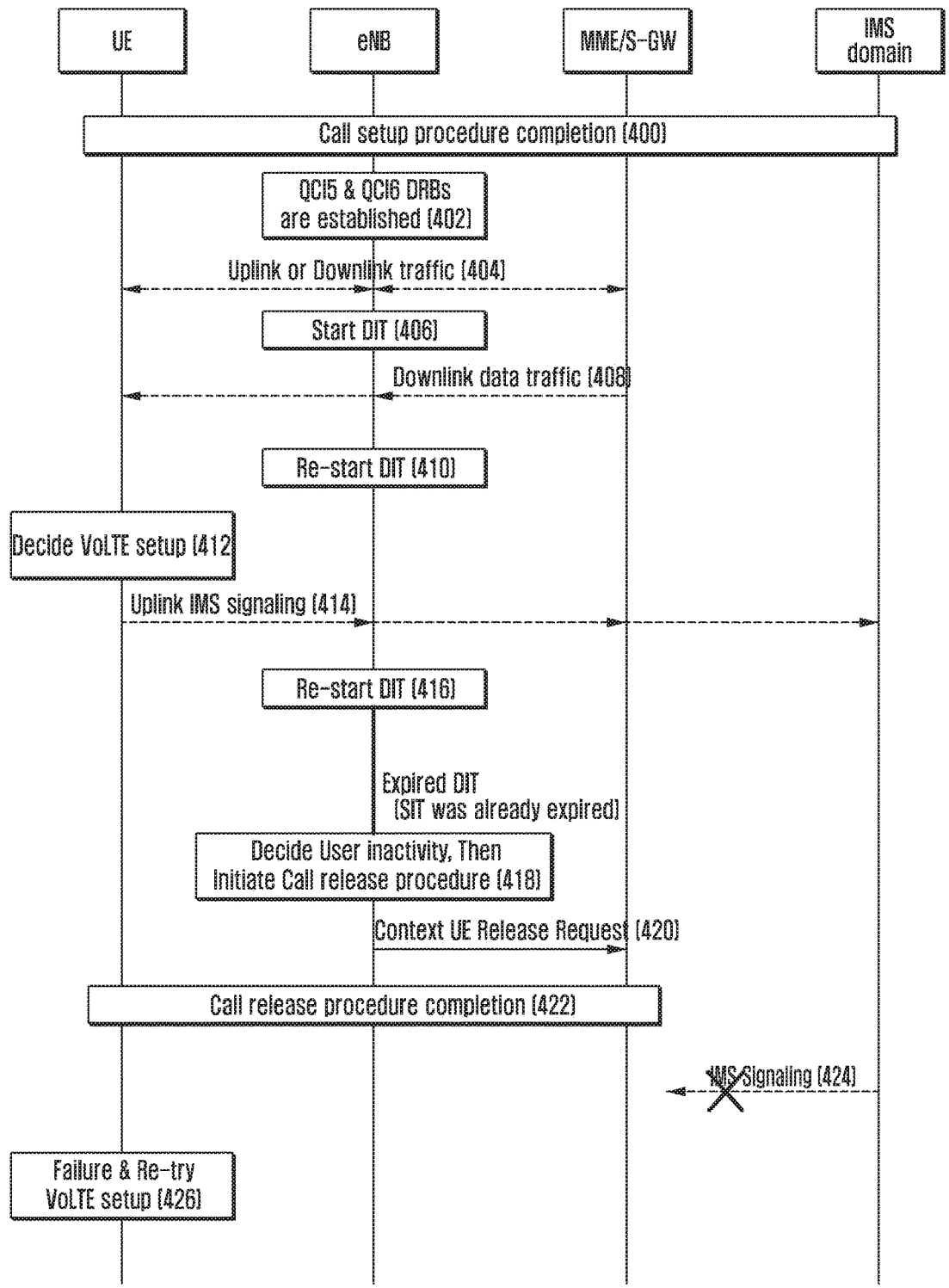
FIG. 4 is a signal flow diagram illustrating a situation in which a signaling procedure of an IMS service-enabled UE is stopped because of the eNB making a wrong decision.

FIG. 4 is a signal flow diagram illustrating a situation in which a signaling procedure of an IMS service-enabled UE is stopped because of a wrong decision made by the eNB 700.

With reference to FIG. 4, a call setup procedure is completed between the IMS service-enabled UE and the eNB 700 at step 400. The IMS service-enabled UE establishes a QCI5 bearer as a default bearer for the IMS service and a QCI6 bearer as a default bearer for a normal data service at step 402. The QCI denotes Quality of Service Class Identification.

If data traffic occurs initially in downlink or uplink between the eNB 700 and the IMS service-enabled UE at step 404, the eNB 700 starts a DIT at step 406. If data traffic occurs in downlink between the eNB 700 and the IMS service-enabled UE at step 408, the eNB 700 initializes the DIT at step 410. Although not shown in the drawing, if data traffic occurs in uplink at step 408, the eNB 700 may initialize the DIT.

The IMS service-enabled UE decides to perform a VoLTE call setup procedure for use of a Voice over LTE (VoLTE) service at step 412. According to the decision, the IMS service-enabled UE sends the eNB 700 an IMS signaling message at step 414. The IMS signaling message is transmitted over a DRB; thus, if the IMS signaling message is received, the eNB 700 restarts the DIT at step 416.

If neither uplink nor downlink data occurs between the eNB 700 and the IMS service-enabled UE before expiry of the DIT, the eNB 700 decides that the IMS-service-enabled UE is in the non-data communication state. Assuming that the IMS service-enabled UE is already in the non-signaling communication state, the eNB 700 performs a procedure for releasing the connection to the IMS service-enabled UE at step 418.

If the connection between the eNB 700 and the IMS service-enabled UE is released or if the connection release is in progress, the response corresponding to the ISM signaling message cannot be delivered to the UE at step 424. Accordingly, the ISM service-enabled UE fails the VoLTE call setup procedure and starts over the VoLTE call setup procedure at step 426.

This problem occurs because the ISM signaling message as signaling traffic is transmitted over the DRB. That is, although the signaling traffic and data traffic are managed separately according to the traffic characteristics, the ISM signaling traffic and data traffic are not distinguishable from each other.

Figure 5:
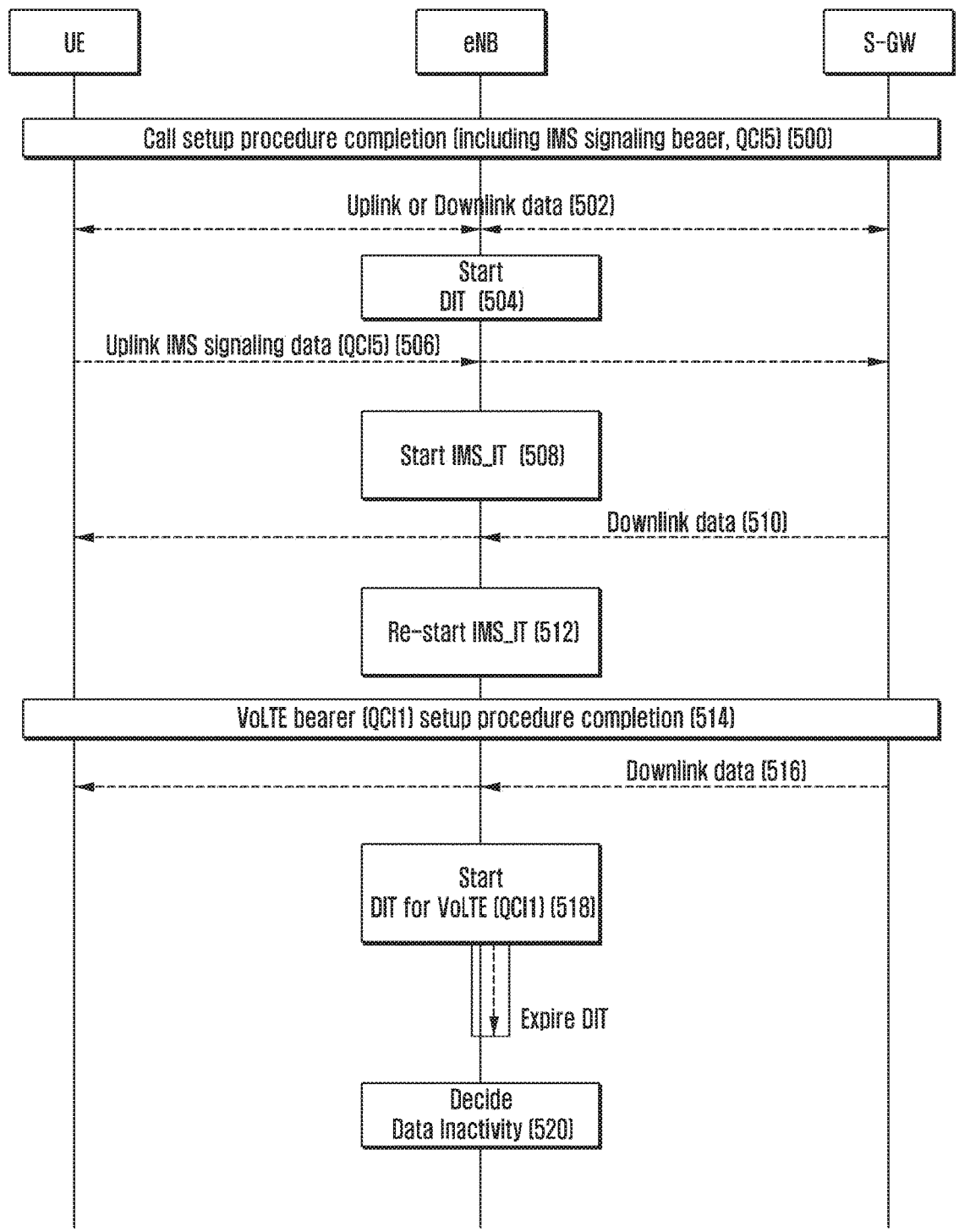
FIG. 5 is a signal flow diagram illustrating an IMS service-enabled UE connection management procedure according to an embodiment of the present invention.

FIG. 5 is a signal flow diagram illustrating an IMS service-enabled UE connection management procedure according to an embodiment of the present invention.

After the call setup has been completed at step 500, if uplink traffic from the UE or downlink traffic destined to the UE is initially received, the eNB 700 starts a DIT at step 502.

Afterward, the traffic is delivered to the eNB 700 over a QCI5 bearer at step 506; the eNB 700 determines that the corresponding UE has requested for an IMS service and thus initializes the IMS Inactivity Timer (IMS_IT) at step 508. The QCI5 bearer is a bearer for transmitting an IMS signal. The IMS_IT is initialized to a preset value reflecting the time required usually for an IMS service request.

If uplink traffic from the UE requesting for the IMS service or downlink traffic to the UE is received, the eNB 700 initializes the IMS_IT at step 512. At this time, if the traffic is delivered over a DRB, the IMS_IT is initialized regardless of the type of the traffic.

If the IMS service request procedure ends at step 514, the eNB 700 initializes the DIT. Although there are many well-known methods for determining whether the IMS service request procedure is completed, the determination is made based on whether a QCI1 bearer has been established. The QCI1 bearer is a bearer for use in a voice call.

If any uplink or downlink traffic of the UE is received, the eNB 700 initializes the DIT at step 518. During the initialization of the DIT, the eNB 700 determines whether the UE has the QCI1 bearer. If the UE has the QCI1 bearer, the eNB initializes the DIT to a value preconfigured with respect to the QCI1. This is to reflect the traffic characteristics of the QCI1 bearer, which is sensitive to packet loss, and to guarantee a predetermined data rate.

If the DIT expires, the eNB 700 determines that the UE is in the non-data communication state at step 520.

Figure 6:
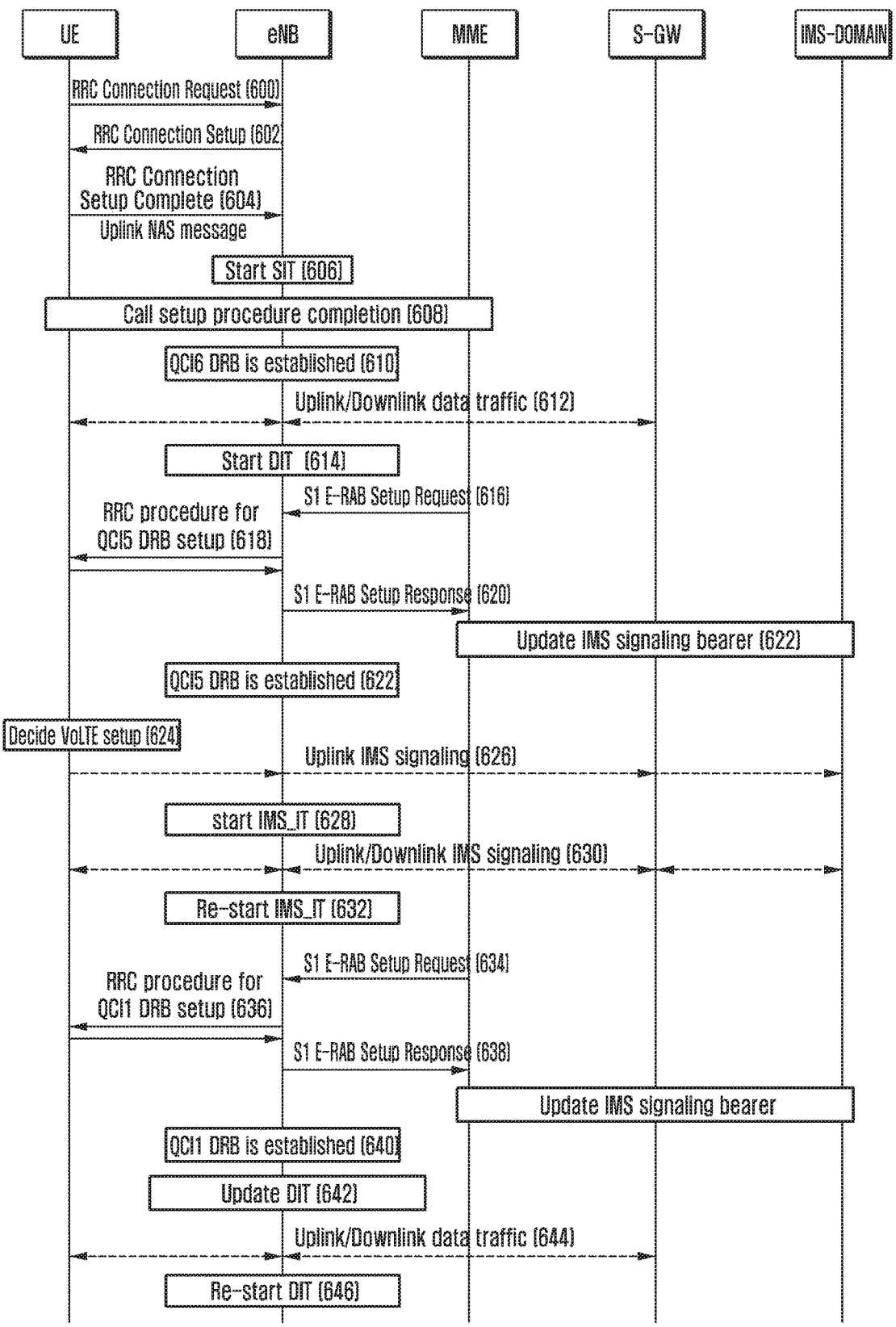
FIG. 6 is a signal flow diagram illustrating an IMS service-enabled UE connection management procedure according to an embodiment of the present invention.

FIG. 6 is a signal flow diagram illustrating an IMS service-enabled UE connection management procedure according to an embodiment of the present invention.

Since steps 600 to 608 of FIG. 6 are identical with steps 300 to 308 of FIG. 3, detailed descriptions thereof are omitted herein.

With reference to FIG. 6, a QCI6 bearer is established at step 610. The QCI6 bearer is typically used for buffered video and TCP file transmission. If uplink or downlink traffic occurs over the QCI6 bearer at step 612, the eNB 700 initializes the DIT at step 614.

Next, the IMS service-enabled UE establishes a QCI5 bearer for transmitting IMS signals at steps 616 to 622. Since this process is not pertinent to the technical characteristics of the present invention, detailed descriptions thereon are omitted herein.

The IMS service-enabled UE decides to use the IMS service (VoLTE service in this embodiment) at step 624 and transmits an IMS signal to the eNB 700 over the QCI5 bearer at step 626. If the IMS signal is received, the eNB 700 determines that the UE has requested the IMS service and initializes the IMS_IT instead of the DIT at step 628.

If any uplink or downlink traffic occurs between the eNB 700 and the UE that has requested for the IMS service at step 630, the eNB 700 initializes the IMS_IT at step 632. If the traffic has been delivered over the DRB, it is not considered whether the traffic is IMS signal traffic or data traffic.

Afterward, if a QCI1 bearer (VoLTE bearer) is established at step 640, the eNB 700 determines that the IMS service request of the UE has been completed and initializes the DIT at step 642.

If uplink traffic from the IMS service-enabled UE or downlink traffic to the UE is received at step 644, the eNB initializes the DIT at step 646. However, during the initialization procedure, the eNB 700 determines whether the UE has the QCI1 bearer for the IMS service; if the UE has the QCI1 bearer, the eNB 700 initializes the DTI to a predetermined value corresponding to the QCI1.

The eNB may set the SIT and DIT corresponding to the respective SRB and DRB for use in determining whether the UE is in the non-communication state to values predetermined for the SIB and DIT, respectively. The predetermined values may be estimated based on 1) a value input to the eNB directly, 2) a value estimated statistically by collecting the real non-communication time information of the UEs, 3) a value received from the MME during the call setup or bearer configuration procedure, or 4) a value estimated based on a combination of at least two of the above 3 values.

The eNB may use a value preconfigured for the IMS_IT corresponding to the QCI5 bearer of the UE to determine whether the UE is in the non-communication state. The preconfigured value may be 1) a value input to the eNB directly, 2) a value estimated statistically by collecting the real non-communication time information of the UEs, 3) a value received from the MME during the call setup or bearer configuration procedure, or 4) a value estimated based on a combination of at least two of the above three values.

Figure 7:
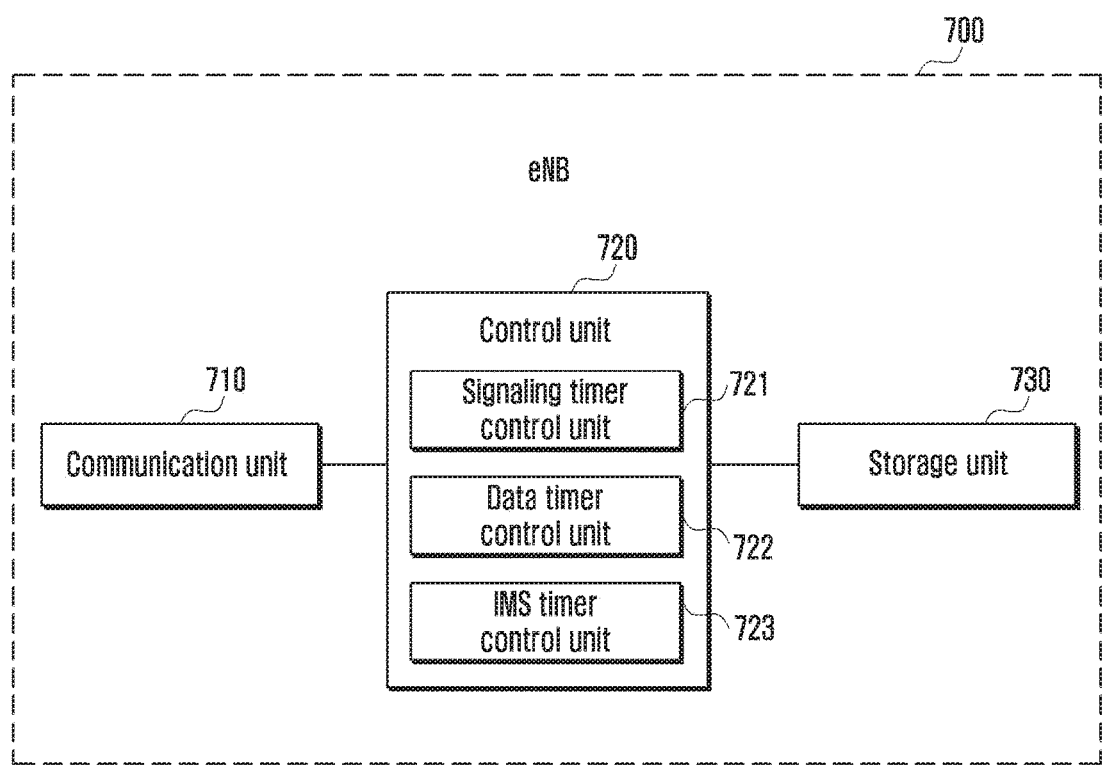
FIG. 7 is a block diagram illustrating a configuration of the eNB 700 according to an embodiment of the present invention.

FIG. 7 is a block diagram illustrating a configuration of the eNB 700 according to an embodiment of the present invention.

With reference to FIG. 7, the eNB 700 according to the present invention includes a communication unit 710, a control unit 720, and a storage unit 730. The eNB 700 may further include other components for key functions of a normal eNB. Detailed descriptions are made of the key components and configurations thereof with the exception of the other components to avoid obscuring the subject matter of the present invention.

The communication unit 710 may communicate with UEs located within the service area of the eNB 700 under the control of the control unit 720. The communication unit 710 may provide the UE with a packet communication service.

The control unit 720 may control the overall operations and components of the eNB 700. For example, the control unit 720 may include an SIT control unit 721, a DIT control unit 722, and an IMS_IT control unit 723.

If the communication unit 710 establishes a connection with the UE, the control unit 720 sets the SIT and DIT corresponding to the SRB and DRB of the UE, respectively.

If the communication unit 710 transmits uplink or downlink traffic between the eNB 700 and the UE, the control unit 720 determines whether the traffic is transmitted over an SRB or DRB.

If the traffic is transmitted over the SRB, the control unit 720 initializes the SIT. In order to initialize the SIT, the control unit 720 checks the priority of the traffic and determines whether to initialize the SIT according to the check result. In this embodiment, the control unit 720 checks that the traffic is an NAS message with a high priority, but other criteria may be used.

If it is determined that the traffic is transmitted over the DRB, the control unit 720 initializes the timer. The timer initialization operation of the control unit 720 is described in detail hereinbelow.

The control unit 720 checks the QCI of the bearer carrying the traffic and the QCI of the bearer allocated to the UE.

If the UE has a QCI1 bearer, the control unit 720 determines that the UE is using the IMS service.

If the bearer carrying the traffic is a QCI5 bearer and the UE does not have a QCI1 bearer, the control unit 720 determines that the UE has requested for the IMS service.

If the bearer carrying the traffic is not the QCI5 bearer and the UE does not have a QCI1 bearer, the control unit 720 determines that the UE is using a normal data service.

The control unit 720 determines the current state of the UE and initializes the corresponding timer.

If the UE has requested for the IMS service, the control unit 720 initializes the IMS_IT to a preconfigured value to determine whether the UE is in the non-communication state.

If the UE is using the IMS service, the control unit 720 initializes the DIT to a preconfigured value for QCI1.

If the UE is using the normal service, the control unit 720 checks the non-communication state judgement time and initializes the DIT to the non-communication state determination time. The non-communication state judgement time may be determined by various methods and, in this embodiment, the UE checks the CQIs of the bearers allocated to the UE and sets the non-communication state judgement time to the greatest value among the preconfigured values corresponding to the checked QCIs. Unlike this, it may also be possible to compare the QCI of the bearer carrying the traffic and the residual time of the DIT and set the non-communication state judgement time to the greatest one of the two values.

The control unit 720 may set the SIT and DIT corresponding respectively to the SRB and DRB allocated to the UE based on the values preconfigured for SIT, DIT, and IMS_IT. Here, the preconfigured values may be 1) a value input to the eNB directly, 2) a value estimated statistically by collecting the real non-communication time information of the UEs, 3) a value received from the MME during the call setup or bearer configuration procedure, or 4) a value estimated based on a combination of at least two of the above three values.

The control unit 702 may set the IMS_IT corresponding to the QCI5 bearer to a value preconfigured for the IMS_IT. The preconfigured values may be 1) a value input to the eNB directly, 2) a value estimated statistically by collecting the real non-communication time information of the UEs, 3) a value received from the MME during the call setup or bearer configuration procedure, or 4) a value estimated based on a combination of at least two of the above three values.

The control unit 720 determines whether to maintain the connection based on the timer, which is determined according to the current state of the UE.

If the UE has not requested for any IMS service, the control unit 720 determines whether the SIT and DIT have expired. If it is determined that both the SIT and DIT have expired, the control unit 720 controls the eNB 700 to release the connection to the UE.

If the UE has requested for an IMS service, the control unit 720 determines whether the SIT and IMS_IT have expired. If it is determined that both the SIT and IMS_IT have expired, the control unit 720 controls the eNB to release the connection to the UE.

The storage unit 730 stores data and programs necessary for the operations of the eNB 700. Particularly, the storage unit 730 according to an embodiment of the present invention may store the information on the types of the bearers allocated to the UEs served by the eNB 700, preconfigured values for use in determining whether the UE which has requested for an IMS service is in the non-communication state, and preconfigured values corresponding to the respective QCIs.

The storage unit 730 may store the information for use in estimating the preconfigured values. The storage unit 730 may also store the actual non-communication times of the UEs determined as the UEs in the non-communication state or the statistical result of the collected non-communication times.

Figure 8:
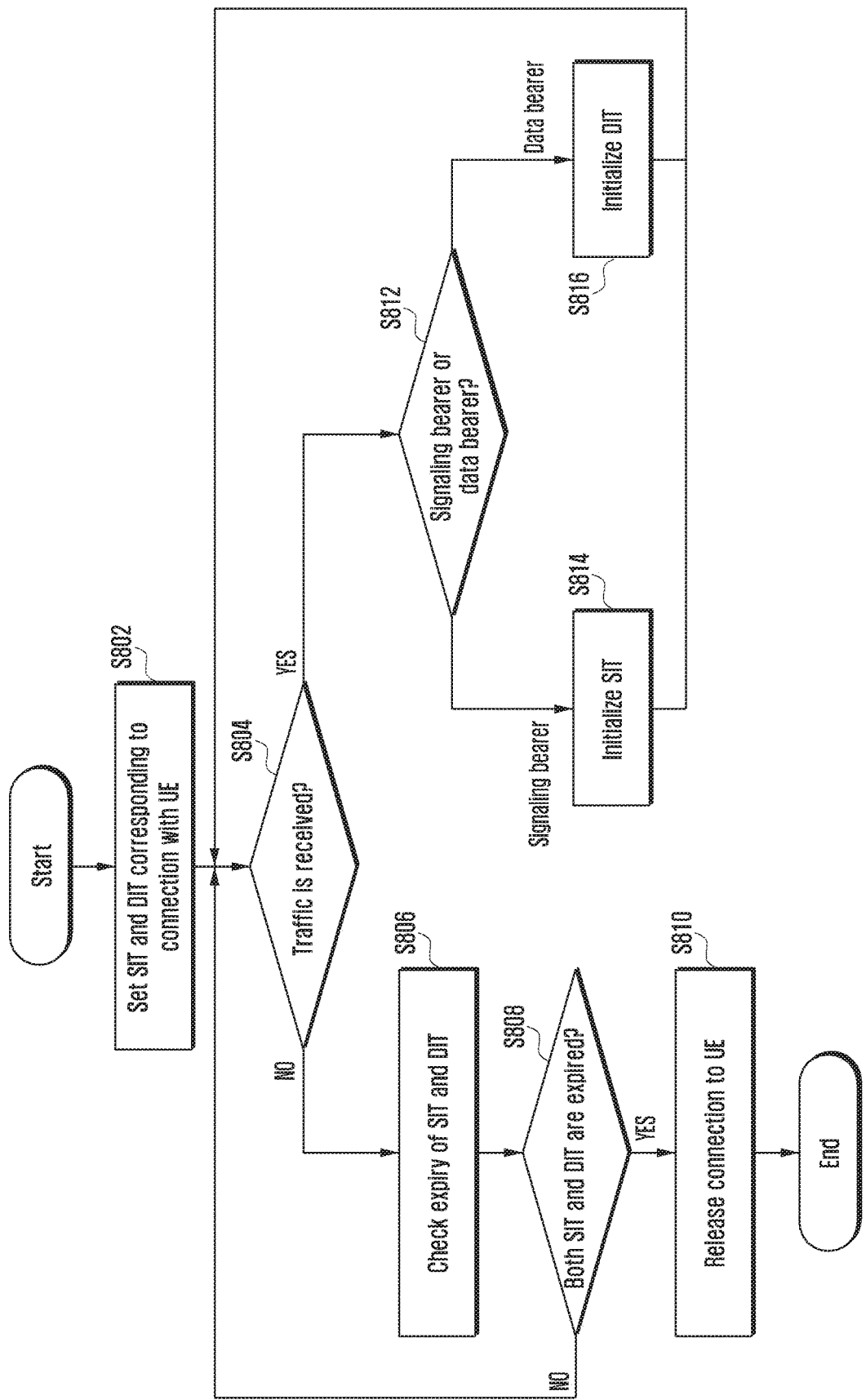
FIG. 8 is a flowchart illustrating a UE connection management procedure of the base station 700 according to an embodiment of the present invention.

FIG. 8 is a flowchart illustrating a UE connection management procedure of the base station 700 according to an embodiment of the present invention.

With reference to FIG. 8, at step S802 the control unit 720 sets the SIT and DIT corresponding respectively to the SRB and DRB allocated to the UE connected to the eNB 700.

The control unit 720 determines whether any uplink traffic of the UE and downlink traffic destined to the UE are received at step S804.

If it is determined at step S804 that no traffic is received, the control unit 720 determines at stop S806 whether the SIT and DIT have expired. If it is determined that both the SIT and DIT have expired, the control unit 720 releases the connection to the UE at step S810.

If it is determined at step S812 that any traffic is received by the communication unit 710, the control unit 720 determines whether the traffic is received over an SRB or a DRB.

If it is determined at step S812 that the traffic is received over the SRB, the control unit 720 initializes the SIT at step S814. The criteria for determining whether to initialize the SIT include priority of traffic.

If it is determined at step S812 that the traffic is received over the DRB, the control unit 720 initializes the DIT at step S816. As described above, the DIT value per UE may be changed according to the QCIs of the bearers allocated to the UE and the combination of the QCIs. If the UE is an IMS service-enabled UE and has requested for an IMS service, the DIT may be identical with the IMS_IT.

Detailed descriptions of functions and structures well known to those skilled in the art and not directly concerning the present invention may be omitted to avoid obscuring the subject matter of the present invention. This aims to omit unnecessary descriptions in order to make the subject matter of the present invention clear.

For the same reason, some of the elements are exaggerated, omitted, or simplified in the drawings and, in practice, the elements may have sizes and/or shapes different from those shown in the drawings. The same reference numbers are used throughout the drawings to refer to the same or like parts.

Advantages and features of the present invention and methods of accomplishing the same may be understood more readily by reference to the following detailed description of exemplary embodiments and the accompanying drawings. The present invention may, however, be embodied in many different forms and should not be construed as being limited to the exemplary embodiments set forth herein. Rather, these exemplary embodiments are provided so that this disclosure will be thorough and complete and will fully convey the concept of the invention to those skilled in the art, and the present invention will only be defined by the appended claims. Like reference numerals refer to like elements throughout the specification.

It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a non-transitory computer-readable memory that can direct a computer or other programmable data processing apparatus to function in a particular manner, such that the instructions stored in the non-transitory computer-readable memory produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Furthermore, the respective block diagrams may illustrate parts of modules, segments, or codes including at least one or more executable instructions for performing specific logic function(s). Moreover, it should be noted that the functions of the blocks may be performed in different order in several modifications. For example, two successive blocks may be performed substantially at the same time, or may be performed in reverse order according to their functions.

According to various embodiments of the present invention, the term "module", means, but is not limited to, a software or hardware component, such as a Field Programmable Gate Array (FPGA) or Application Specific Integrated Circuit (ASIC), which performs certain tasks. A module may advantageously be configured to reside on the addressable storage medium and be configured to be executed on one or more processors. Thus, a module may include, by way of example, components (such as software components, object-oriented software components, class components, and task components), processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. In addition, the components and modules may be implemented such that they execute one or more CPUs in a device or a secure multimedia card.

Although various embodiments of the present disclosure have been described using specific terms, the specification and drawings are to be regarded in an illustrative rather than a restrictive sense in order to help understand the present invention. It is obvious to those skilled in the art that various modifications and changes can be made thereto without departing from the broader spirit and scope of the invention.

The invention claimed is:
1. A method for managing a connection of a terminal by a base station, the method comprising:
setting a signaling timer corresponding to a signaling bearer for control signaling and a data timer corresponding to a data bearer for data transmission, wherein a time value for the data timer is set to a greatest one among preconfigured values corresponding to quality of service class identifiers (QCIs) of at least one data bearer;

determining whether data is carried over the signaling bearer or the data bearer;

initializing, by the base station, the signaling timer in a case that the data is carried over the signaling bearer and initializing, by the base station, the data timer in a case that the data is carried over the data bearer; and releasing the connection to the terminal in a case that the signaling timer and the data timer are expired.

2. The method of claim 1, wherein initializing the signaling timer comprises skipping, in a case that the data carried over the signaling bearer is not a Non-Access Stratum (NAS) signal, initializing the signaling timer.

3. The method of claim 1, wherein the setting of the data timer comprises:

checking a bearer carrying the data;

checking a preconfigured value corresponding to QCI of the checked bearer;

comparing the preconfigured value with a residual time of the data timer;

determining, in a case that the preconfigured value is greater than the residual time of the data timer, the preconfigured value as the time value for the data timer; and determining, in a case that the preconfigured value is less than the residual time of the data timer, the residual time of the data timer as the time value for the data timer.

4. The method of claim 1, wherein the setting of the data timer comprises:

determining whether the terminal has a QCI1 bearer; and determining, in a case that the UE has the QCI1 bearer, a value preconfigured for the QCI1 as the time value for the data timer.

5. The method of claim 1, further comprising:

checking QCI of a bearer carrying the data; and determining, in a case that the bearer carrying the data is a QCI5 bearer and the terminal has no QCI1 bearer, that the terminal is requesting an IP Multimedia Subsystem (IMS) service; and setting an IMS timer.

6. The method of claim 5, further comprising:

determining whether the data is carried over the signaling bearer or the data bearer;

initializing, in a case that the data is carried over the signaling bearer, the signaling timer;

determining, in a case that the data is carried over the data bearer, whether the terminal is requesting for an IMS service;

initializing, in a case that the terminal is requesting for the IMS service, the IMS timer; and initializing, in a case that the terminal is not requesting for the IMS service, the data timer.

7. A base station for managing a connection of a terminal, the base station comprising:

a transceiver; and a controller coupled with the transceiver and configured to control to:

set a signaling timer corresponding to a signaling bearer for control signaling and a data timer corresponding to a data bearer for data transmission, wherein a time value for the data timer is set to a greatest one among preconfigured values corresponding to quality of service class identifiers (QCIs) of at least one data bearer, determine whether data is carried over the signaling bearer or the data bearer, initialize the signaling timer in a case that the data is carried over the signaling bearer and initialize the data timer in a case that the data is carried over the data bearer, and release the connection to the terminal in a case that the signaling timer and the data timer are expired.

8. The base station of claim 7, wherein the controller is further configured to skip, in a case that the data carried over the signaling bearer is not a Non-Access Stratum (NAS) signal, initializing the signaling timer.

9. The base station of claim 7, wherein the controller is further configured to:

check a bearer carrying the data, check a preconfigured value corresponding to QCI of the checked bearer, compare the preconfigured value with a residual time of the data timer, determine, in a case that the preconfigured value is greater than the residual time of the data timer, the preconfigured value as the time value for the data timer, and determine, in a case that the preconfigured value is less than the residual time of the data timer, the residual time of the data timer as the time value for the data timer.

10. The base station of claim 7, wherein the controller is further configured to:

determine whether the terminal has a QCI1 bearer and determine, in a case that the UE has the QCI1 bearer, a value preconfigured for the QCI1 as the time value for the data timer.

11. The base station of claim 7, wherein the controller is further configured to:

check a QCI of a bearer carrying the data, and determine, in a case that the bearer carrying the data is a QCI5 bearer and the terminal has no QCI1 bearer, that the terminal is requesting an IP Multimedia Subsystem (IMS) service, and set an IMS timer.

12. The base station of claim 11, wherein the controller is further configured to:

determine whether the data is carried over the signaling bearer or the data bearer, initialize, in a case that the data is carried over the signaling bearer, the signaling timer, determine, in a case that the data is carried over the data bearer, whether the terminal is requesting for an IMS service, initialize, in a case that the terminal is requesting for the IMS service, the IMS timer, and initialize, in a case that the terminal is not requesting for the IMS service, the data timer.

* * * * *